United States Patent [19]

Grot

[11] 3,718,627
[45] Feb. 27, 1973

[54] $CF_2=CFCF_2CF_2SO_2F$ AND DERIVATIVES AND POLYMERS THEREOF

[75] Inventor: Walther Gustav Grot, Chadds Ford, Pa.

[73] Assignee: E. J. du Pont de Nemours and Company, Wilmington, Del.

[22] Filed: Nov. 26, 1968

[21] Appl. No.: 779,273

Related U.S. Application Data

[63] Continuation-in-part of Ser. No. 595,332, Nov. 18, 1966, abandoned.

[52] U.S. Cl. ....260/79.3 MU, 260/2.2 R, 260/513 R, 260/543 F, 260/556 F
[51] Int. Cl..C07c 143/68, C07c 143/70, C08f 15/02
[58] Field of Search....260/79.3, 543 F, 513 R, 556 F

[56] References Cited

UNITED STATES PATENTS 3,041,317   6/1962   Gibbs..................................260/79.3

Primary Examiner—James A. Seidleck
Assistant Examiner—C. A. Henderson, Jr.
Attorney—Edwin Tocker

[57] ABSTRACT

The compound $CF_2=CFCF_2CF_2SO_2F$ and derivatives thereof are prepared and polymerized to polymers, including copolymers such as with tetrafluoroethylene, which are useful as ion exchange resins.

5 Claims, No Drawings

$CF_2=CFCF_2CF_2SO_2F$ AND DERIVATIVES AND POLYMERS THEREOF

This patent application is a continuation-in-part of U.S. Pat. application Ser. No. 595,332, filed Nov. 18, 1966, now abandoned by the same inventor.

This invention relates to a fluorocarbon compound and more particularly to a fluorocarbon vinyl compound containing sulfonyl fluoride.

This preparation of the compound $CF_2=CFSO_2F$ and its copolymerization with fluorinated ethylenes are disclosed in U.S. Pat. No. 3,041,317 to Gibbs et al. The preparation of the compound $CF_2=CF(OCF_2CF)_nOCF_2CF_2SO_2F$ wherein n is 1 to 3 and its copolymerization with fluorinated ethylenes is disclosed in U.S. Pat. No. 3,282,875 to Connolly et al.

The present invention provides the compound $CF_2=CFCF_2CF_2SO_2M$, wherein M is F, Cl, OH, amine or the group $-OMe$ wherein Me is alkali metal or quaternary ammonium, and polymers of said compound.

The compound $CF_2=CFCF_2CF_2SO_2F$ is made by the following procedure:

The compound $CF_2ClCFClCF_2CFClCF_2CO_2H$ (Kel-F acid 683) was decarboxylated via the sodium salt to yield 4,5-dichloroperfluoropentene-1 according to the procedure of J.S. Fearn et al., *J. Polymer Sci. A-1*, 4 131 (1966). This olefin (92 g.) was reacted with an excess (40 to 50 g.) of freshly distilled $SO_3$ for 12 hours. The temperature at the beginning of the reaction was 40°C. and at the end, 60°C. The reaction product was the sultone

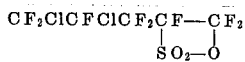

(b.p. 60°/25 mm.) which was distilled from the reaction medium. The sultone was then added to water and let stand at 25°C. for 12 hours to give a 20 percent yield of $CF_2ClCFClCF=CFSO_2F$. This reaction mixture was heated to 100°C. under a stream of 25 weight per cent $F_2$ in nitrogen to yield $CF_2ClCFClCF_2CF_2SO_2F$ quantitatively. This dichloride was dechlorinated by refluxing (ca. 95°C.) with zinc dust in dioxane for 30 minutes to yield 4-fluorosulfonyl perfluorobutene-1, $CF_2=CFCF_2CF_2SO_2F$, which was worked-up from the dechlorination reaction mixture by filtration thereof, followed by addition to water to form a lower layer which was washed with water and dried with $CaSO_4$. Further purification is done by vapor phase chromatography or by distillation. The retention time is a 6 foot × ¼ inch col. containing 25 per cent G.E. Silicone SE 30 on Chromosorb at 70°C. is 0.7 minute (for air = 0.4 minute). The structure of the compound obtained, which is a liquid at room temperature, was confirmed by NMR, mass spectral analysis, and infrared analysis (distinguishing bands at 1780 and 1460 cm$^{-1}$).

The sulfonyl fluoride compound of this invention can be converted to the other sulfonyl derivatives disclosed hereinbefore or can be polymerized, followed by conversion of the sulfonyl fluoride side chain group to such other sulfonyl derivatives, if desired, by conventional procedures such as disclosed in U.S. Pat. No. 3,282,875 to Connolly et al.

For example, the sulfonyl fluoride group can be converted to the $-SO_2Cl$ group by slow heating in the presence of phosphorous pentachloride. The sulfonyl fluoride group can be converted to the sulfonate group by hydrolysis with an alkali metal ammonium, or quaternary ammonium hydroxide or carbonate. The alkali metal group can be any alkali metal. Examples of quaternary ammonium groups include the alkyl and alkyl/aryl ammonium groups such as tetramethyl ammonium, tetraethylammonium, phenyltriethylammonium. The sulfonyl fluoride group can be converted to the amide group, $-SO_2NH_2$, by contacting with ammonia. Preferably, the conversion reactions are carried out on the polymer. When the conversion reactions are carried out on the monomer, preferably the neutralizing compound is in the form of a salt, such as a carbonate.

The compound of this invention is generally but not necessarily polymerized in the sulfonyl fluoride form using a perfluorocarbon solvent and a perfluorinated free radical initiator. Examples of such solvents are the perfluoroalkanes and the perfluorocycloalkanes, such as perfluoroheptane and perfluorodimethylcyclobutane. Examples of such initiators include perfluoroperoxides and the nitrogen fluorides such as $N_2F_2$. The polymerization temperatures will vary from $-50°$ to $+200°C.$, depending on the initiator used. Pressure is not critical and is generally employed to control the ratio of any gaseous monomer or comonomer present. Examples of suitable comonomers include the copolymerizable fluorinated ethylenes in which the vinyl group is at least di-substituted with fluorine atoms, such as vinylidene fluoride, chlorotrifluoroethylene, tetrafluoroethylene, and hexafluoropropylene. Other comonomers can be present in small amounts such as to provide up to about 6 mole per cent thereof in the resultant copolymer, such as the perfluoro(alkyl vinyl ethers) wherein the alkyl group contains from 1 to 6 carbon atoms. Generally, the copolymer will contain at least 0.5 mole per cent of repeat units

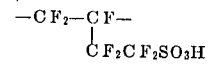

derived by copolymerization of the sulfonyl-containing monomer of this invention (usually in the $-SO_2F$ form followed by conversion to $-SO_3H$), and usually no more than 50 mole per cent of such units are present in the copolymer.

The following polymerization procedure can be employed: approximately equal weight amounts of $CF_2=CFCF_2CF_2SO_2F$ and $CF_2=CF_2$ (total 80 g.) are added to a polymerization vessel containing 200 ml. of perfluorodimethylcyclobutane. About 0.5 g. of difluorodiazine is pressured into the vessel under a $N_2$ pressure of 800 psi. The mixture is agitated and the temperature slowly raised to 80°C. and maintained at that temperature for about an hour. On cooling and evaporation of the solvent, the copolymer is obtained, with the presence of the sulfonyl fluoride monomer units in the copolymer being detectable by infrared analysis.

The sulfonyl-containing compounds of this invention, and polymers, including copolymers containing units derived from such compounds, can be used in the same manner as the vinyl ethers disclosed in U.S. Pat.

No. 3,282,875 to Connolly et al., such as for ion exchange resins.

As many apparently widely different embodiments of this invention may be made without departing from the spirit and scope thereof, it is to be understood that this invention is not limited to the specific embodiments thereof except as defined in the appended claims.

What is claimed is:

1. Compounds of the formula $CF_2=CFCF_2CF_2SO_2M$, wherein M is F, Cl, OH, amine or the group -OMe wherein Me is alkali metal or quaternary ammonium.

2. $CF_2=CFCF_2CF_2SO_2F$.

3. A polymer containing the repeat unit $$-CF_2-CF- \\ \quad\quad | \\ \quad\quad CF_2CF_2SO_2M$$

wherein M is F, Cl, OH, amine or the group -OMe wherein Me is alkali metal or quaternary ammonium.

4. The polymer of claim 3 wherein said polymer is a copolymer of a fluorinated ethylene and the monomer of said repeat unit.

5. The polymer of claim 4 wherein said fluorinated ethylene is tetrafluoroethylene.

* * * * *